Nov. 7, 1967  S. J. SMITH  3,350,943
JET STREAM INDICATOR
Original Filed July 10, 1962  2 Sheets-Sheet 2
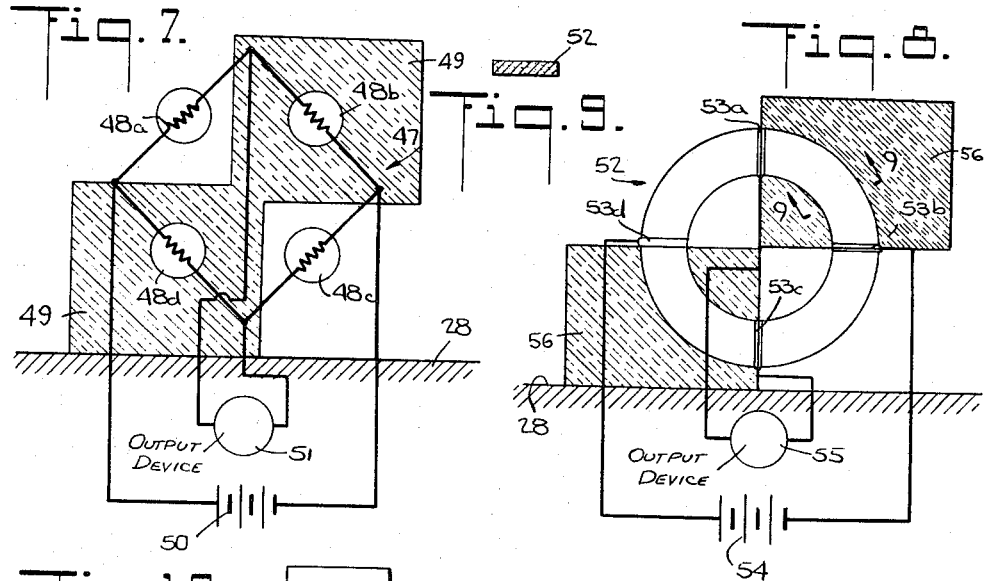
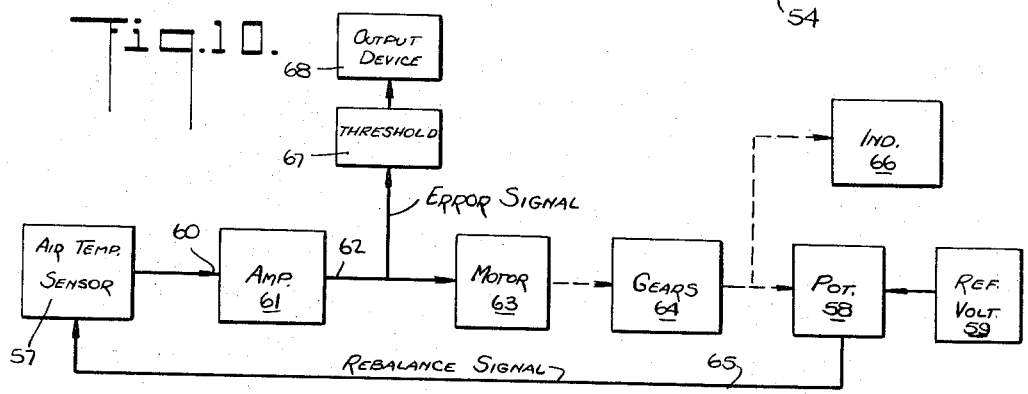
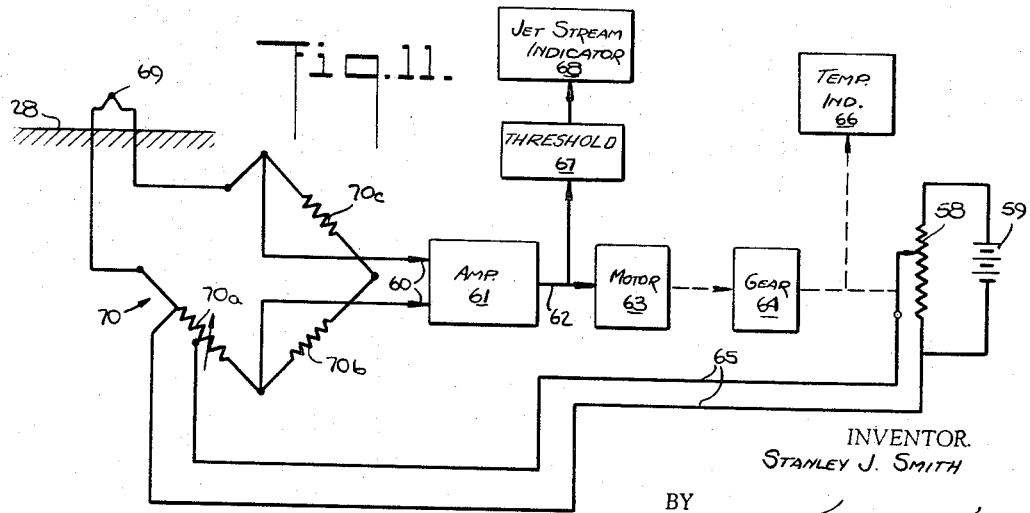
INVENTOR.
STANLEY J. SMITH
BY
Kenyon & Kenyon
ATTORNEYS

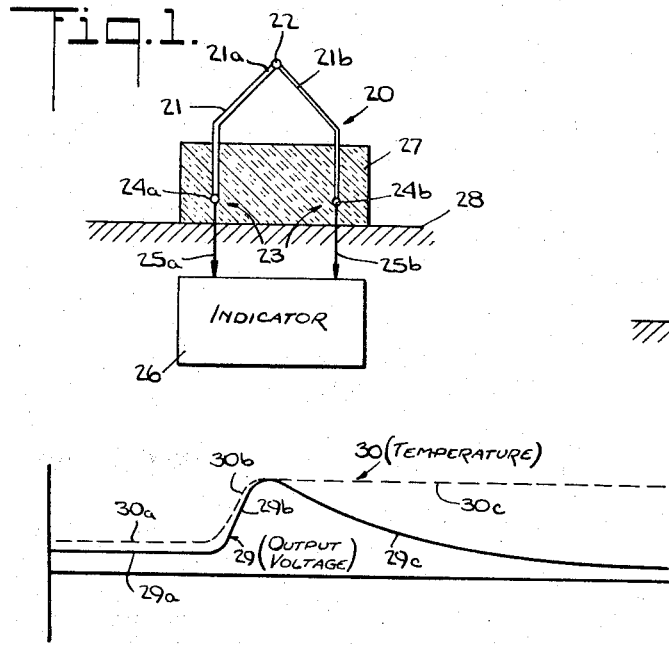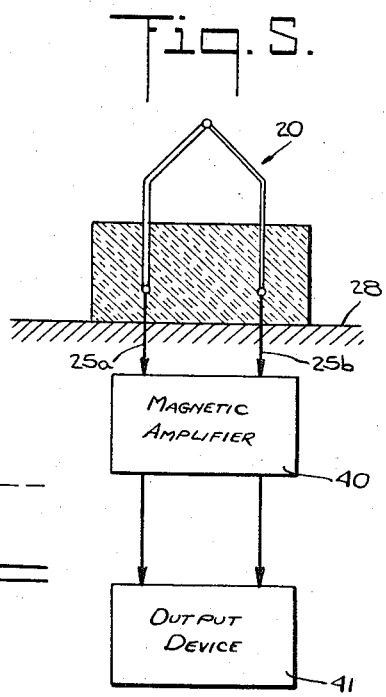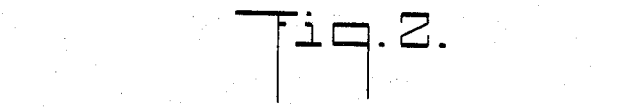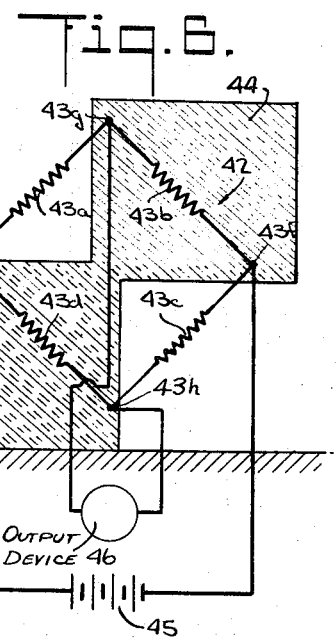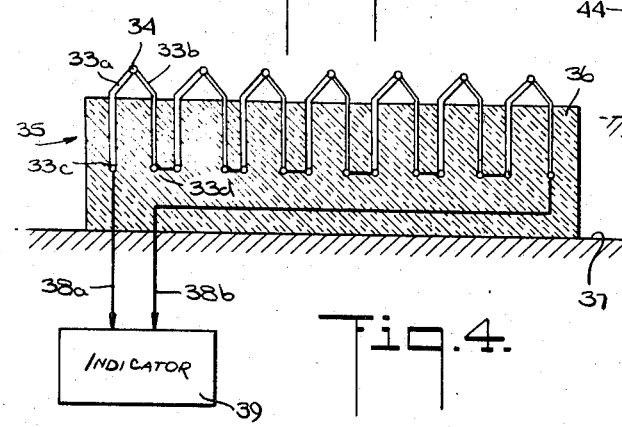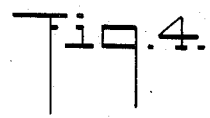

United States Patent Office 3,350,943
Patented Nov. 7, 1967

3,350,943
JET STREAM INDICATOR
Stanley J. Smith, Southbury, Conn., assignor to Simmonds Precision Products, Inc., Tarrytown, N.Y., a corporation of New York
Original application July 10, 1962, Ser. No. 208,820. Divided and this application Nov. 15, 1965, Ser. No. 517,198
5 Claims. (Cl. 73—362)

This application is a division of U.S. application Ser. No. 208,820, filed July 10, 1962, now abandoned.

This invention relates to a device for sensing a change in temperature and more specifically to a device for sensing the change in air temperature which is experienced whenever an aircraft enters or leaves the "jet stream."

The phenomenon known as the jet stream has become an important factor in recent years due to the operation of jet aircraft at the upper altitudes where the jet stream is present. The jet stream is a relatively narrow fast moving wind current which is flanked by slowly moving currents. It is observed principally in the zone of prevailing westerly winds in the region above the lower troposphere and generally a jet stream reaches its maximum intensity in speed and concentration near the tropopause. The great speed of the wind at the core of the jet stream and the variations of wind speed in its vicinity can significantly influence the operation of aircraft. Since the jet stream lies in the zone of maximum temperature contrast between cold air masses in the north and warm air masses in the south, the position of the jet stream at any given time usually coincides in part with the regions of greatest storminess in the lower troposphere but the jet stream can occur in regions which are completely clear.

During the winter periods, speeds in the jet core may exceed 200 knots for a distance of several hundred miles in the direction of the wind. Lateral winds frequently reach values of 100 knots per 300 nautical miles to the right of the jet stream current and as high as 100 knots per 100 nautical miles to the left. On the other hand vertical winds above and below the jet core are often as large as 20 knots per 1000 feet. The direction of jet streams are predominantly westerly but jet streams in other directions may occur in the middle or high latitudes when ridges and troughs in the normal westerly current are pronounced.

Indication of the presence of the jet stream and the entry or exit of an aicraft with respect to it is important in order to enable the pilot to utilize or avoid the jet stream depending upon the direction of his desired flight path with respect to it. Thus if a pilot wishes to take advantage of a jet stream condition which is substantially parallel to his planned line of flight, it is necessary for the pilot initially to be able to sense his entry into the jet stream and subsequently to detect egress from it so that corrective maneuvers can be performed in order to maintain the flight within the jet stream for the extent of its useable range.

One indication of the presence of the jet stream is the characteristic of a discreet change in temperature between the jet stream and the surrounding region. Since this change in temperature is of small magnitude, it becomes difficult to detect it and to separate it from the very large changes in the ambient air temperature which are normally present. In order to be sufficiently sensitive, it has been estimated that a jet stream indicator based upon the change in temperature must be capable of detecting in the range of approximately a one degree centigrade change in temperature and due to the high speed operation of the aircraft, it is necessary that the indication be displayed practically instantaneously or at least within several seconds. Since an aircraft can operate over a range of ambient temperatures of at least 100° C. it is evident that a jet stream indicator based upon the rate of change of temperature must be capable of detecting a very small change in temperature from a relatively large range of temperatures.

An object of this invention is to provide a device for sensing the entry and exit of an aircraft with respect to a jet stream.

Another object of the invention is to provide a device for indicating the small change in temperature which is experienced when moving into or out of a jet stream.

An additonal object of the invention is to provide a sensor capable of responding to the small change in temperature such as those adjacent a jet stream.

A further object of the invention is to provide a device for indicating small changes in temperature such as those adjacent the jet stream without the need of indicating absolute values of temperature.

A still further object of the invention is to provide a system for sensing changes in condition as detected by condition-responding devices.

In one embodiment of the invention the device for sensing the change in temperature comprises means for responding at a predetermined rate to a change in temperature and additonal means for responding at a rate different than the predetermined rate to a change in temperature. The change in temperature can be then sensed by the difference in the rates of response of the responding means.

In another embodiment of the invention, the responding means include the junctions of a thermocouple. Means are provided for retarding the response of one of the junctions to a change in temperature. Due to the retarding means the junctions respond to the temperature change at different rates thereby providing an indication of the change.

In still another embodiment of the invention the responding means include temperature responsive resistors, at least one of which is provided with means for retarding its response when the resistors are subjected to a temperature change.

In an additional embodiment of the invention thermistor elements are employed as the temperature responding means. Again the response of at least one of the thermistor elements is retarded so that the elements respond at different rates in the presence of a temperature change.

In a further embodiment of the invention a temperature sensor is adapted to actuate a servo system having a predetermined rate of follow-up. By maintaining the follow-up rate at a sufficiently low level the servo system is prevented from responding immediately to rapid changes in temperature. Means are provided to sense the absence of imediate follow-up and thereby sense the rapid change in temperature which occurs adjacent the jet stream.

Various other objects and advantages of the present invention will be readily apparent from the following detailed description when considered in connection with the accompanying drawings in which:

FIG. 1 is a schematic representation of a thermocouple having both exposed and insulated junctions;

FIG. 2 is a graphical representation of the approximate response of the sensing device in an embodiment of the invention in the presence of a sudden increase in temperature;

FIG. 3 is a graphical representation of the response of the sensing device in an embodiment of the invention in the presence of a sudden decrease in temperature;

FIG. 4 is a schematic representation of a plurality of connected thermocouples each having exposed and insulated junctions;

FIG. 5 is a schematic representation of the thermocouple sensing device of the invention connected to an indicating system;

FIG. 6 is a schematic representation of a network of temperature responsive resistors which are both exposed and insulated;

FIG. 7 is a schematic representation of the sensing device of the invention employing exposed and insulated thermistor elements;

FIG. 8 shows a bridge element formed from a substantially homogeneous ring of thermistor material which is adapted to have an exposed portion and/or insulated portion;

FIG. 9 is a transverse section of the ring of FIG. 8 taken along the line 9—9 of FIG. 8;

FIG. 10 is a schematic representation of a servo system embodiment of the invention; and FIG. 11 is a schematic representation of a servo embodiment of the invention employing a temperature responsive bridge network.

In one embodiment of the invention shown in FIG. 1, sensing device 20 comprises thermocouple 21 having portions 21a and 21b of dissimilar materials. In accordance with thermocouple principles, one junction 22 of the device is disposed at the junction of the two dissimilar metals while the other junction 23 is that formed by an electrical connection across the ends of the leads extending from junction 22. Junction 23 comprises terminals 24a and b to which are attached leads 25a and b connected to indicator 26. Junction 23 which is remote from exposed junction 22, the junction of the two dissimilar metals, is generally known as the "cold junction" or "reference junction." Whenever junctions 22 and 23 are at different temperatures they become temperature responsive in that a thermocouple voltage is developed across them. Indicator 26 which is adapted to sense the electrical response of the junctions can comprise a volt meter or the like. In accordance with the provisions of the invention junction 23 is mounted within insulator 27 which serves to retard the flow of heat with respect to this junction and thereby retards its response to temperature changes.

Sensing device 20 is adapted to serve as the sensor for a jet stream indicator by being mounted in a position exposed to the air conditions outside of the aircraft, that is outside of or adjacent to the outer surface of aircraft skin 28. Upon a prolonged exposure to substantially constant ambient conditions about sensing device 20 as shown by portion 30a of curve 30 in FIG. 2, the output voltage 29 of the device is substantially constant as shown by portion 29a of the curve 29. Thus when junctions 22 and 23 are substantially at the same temperature condition there is no thermocouple voltage.

Upon entering the jet stream a sudden temperature increase shown by portion 30b of the curve can occur, after which the temperature levels off into portion 30c. During the temperature increase the temperature at junction 22 can change very rapidly since this is the exposed junction. On the other hand, junction 23 is retarded in response by the effect of insulator 27. The result is that junction 22 changes temperature in response to the ambient change before junction 23 can change. The result is a difference in temperature between junctions 22 and 23 which due to the presence of the dissimilar metals causes a thermocouple voltage to be developed. The thermocouple voltage which results is shown by portion 29b of the curve. Since the insulator is then exposed to the elevated temperature, heat transfer takes place and junction 23 is heated toward the elevated temperature. During the flow of heat to junction 23 the difference in temperature between the junctions is gradually reduced and thus the thermocouple voltage decreases as shown in portion 29c of the curve. As soon as the two junctions approach a constant temperature condition the thermocouple voltage gradually reduces to zero.

FIG. 3 shows the temperature and voltage conditions of the sensing device which can occur when the aircraft leaves the jet stream at which time there is a decrease in temperature in a short duration of time. Curve 31 represents the temperature change while curve 32 represents that of the thermocouple voltage. Portions 31a and 32a correspond to the steady state condition. Portions 31b and 32b show the transient condition during the temperature decreases while portions 31c and 32c represent the return to equilibrium after the change in temperature has occurred.

As shown in the curves in FIGS. 2 and 3, the change in temperature upon entering or leaving the jet stream occurs in a very short space of time. This change is more rapid than that experienced from changes in altitude during climbs, descents, or maneuvers so that the sensing device of the invention is adapted to distinguish the short term transient condition of entering and leaving the jet stream from comparatively long term transient conditions accompanying normal operation. Thus regardless of changes and even relatively large changes in the ambient temperature, the rapid change in temperature accompanying movement with respect to the jet stream can be distinguished.

FIGS. 2 and 3 additionally demonstrate that the sensing device of the invention is not only capable of sensing the presence of the movement with respect to the jet stream but also the direction of movement since the polarity of the thermocouple device reverses when the change is from an increase to a decrease of the temperature of one junction with respect to the other. In other words, when one junction is at a greater temperature than the other, one polarity exists and when this condition is reversed the opposite polarity exists.

Since sensing device 20 can provide both information as to the presence of the change but also as to the sense of the temperature change, indicator 26 can indicate the presence of the jet stream and the direction of movement with respect to it by sensing a "temperature rise" or "temperature fall." The time constant of the device can be controlled by the selection of the insulating properties of insulator 27. Thus the flow of heat with respect to junction 23 can be retarded for a greater or lesser period by the selection of the insulator 27.

The electrical signal available from a single thermocouple is of a very small order. As shown in FIG. 4, a considerable improvement in the device can be effected by employing a plurality of thermocouples 33 each having dissimilar metals 33a and b joined at junction 34 which is exposed to the ambient conditions. The thermocouples can be connected to one another at terminals 33c and 33d which form the other junctions of the thermocouples, namely junctions 35. Similarly, as discussed in connection with FIG. 1, junctions 35 are mounted within insulator 36 and the sensing device is in turn mounted adjacent to the outer surface of the skin 37 of the aircraft in order to be exposed to ambient conditions. Leads 38a and b connect the output of the device to indicator 39 which can be a moving coil type of millivoltmeter.

In FIG. 5, sensing device 20 is shown connected by leads 25a and b to magnetic amplifier 40 which is adapted to be driven by the output of the thermocouple. Magnetic amplifier 39 is connected to output device 41 which can comprise an indicator, a relay device, or other control devices.

In another embodiment of the invention shown in FIG. 6 sensing device 42 comprises a thermally sensitive resistance bridge including resistors 43a–d. Resistors 43a and c are exposed while at least one of resistors 43b and d are mounted within insulator 44. Power is supplied to the bridge by source 45 connected to terminals 43e and f. Output device 46 which is connected to terminals 43g and 43h of the bridge network can include a relay arrangement, an indicator or the like. Similarly as in the thermocouple arrangements, resistors 43a and c which are exposed to the ambient conditions will respond rapidly to changes in the ambient temperature. On the other hand, resistors 43b and d being mounted within insulator 44 are retarded in their response to temperature changes. Since the resistors 43a–d are affected by temperature the immediate change in temperature at resistors 43a and c causes the balance of bridge network 42 to be upset and the unbalanced condition is sensed by output device 46. If only one of resistors 43a and c are insulated, unbalance still results. The time constant of the arrangement is dependent upon the characteristics of insulator 44. Thus insulator 44 determines the period of time which is necessary to bring resistors 43b and 43d to the new temperature condition already present at resistors 43a and c. At this point the balance of the bridge network is re-established and the output device no longer senses a transient condition.

The embodiment shown in FIG. 7 includes bridge network 47 which includes thermistor elements 48a–d which are temperature responsive. Thermistors 48b and 48d are mounted within insulator 49 which retards their response to changes in the ambient temperature. The bridge network is energized by power source 50 while the output of the bridge is sensed by output device 51. The bridge network and insulator can be mounted outside or adjacent to skin 28 of the aircraft in order to be subjected to the ambient conditions surrounding the aircraft as well as the changes in ambient conditions upon movement into or out of the jet stream. As previously discussed a change of ambient temperature conditions is rapidly responded to by the exposed thermistors 48a and 48c. This response upsets the balance of the bridge network and is sensed by output device 51. The bridge remains unbalanced so long as thermistors 48b and 48d are at a different temperature than that of thermistors 48a and 48c. The insulating of one of thermistors 48b and 48d can also cause unbalance.

The use of the thermistors in the bridge arrangement is advantageous since these devices have a very large negative temperature coefficient of resistance and they are adaptable to a wide variety of bridge configurations. The thermistors can provide many times the output of bridge arrangements employing temperature responsive resistors such as those fabricated from nickel and nickel alloys.

The thermistors as well as the resistors used in the bridge arrangements must have substantially the same temperature coefficient curves for a range of temperatures for otherwise the balance of the bridge can be upset even though all of the responsive elements are at the same temperature. The embodiment of FIG. 8 enables the bridge to remain balanced for a complete range of equilibrium temperature conditions. The bridge network of the arrangement shown in FIG. 8 comprises thermistor ring 52 to which is attached taps 53a–d. One or both of the portions extending between taps 53a and b and between taps 53c and d can be insulated as shown in FIG. 8 since one or both of the portions can cause unbalance in the bridge network. Ring 52 which can have a substantially rectangular cross-section as shown in FIG. 9 is formed from a common batch of thermistor material. By selecting the material from a common batch the statistical distribution of material is virtually complete and thus the temperature coefficient characteristic of the material can be controlled to be uniform throughout all portions of the bridge. Thus the uniformity of the ring is maintained by controlling the uniformity of the thermistor material within it and by controlling the uniformity of the geometrical dimensions of the ring.

The ring can be divided into a bridge network such as by equally spacing taps 53a–d about its circumference. In this way a network comprising four equal resistances can be obtained. The bridge is energized by source 54 and any unbalance of the bridge is sensed by output device 55. In order to sense a temperature change, a portion of the bridge can be exposed to the ambient conditions while the remainder of the bridge is mounted in insulator 56 which retards the response of that portion of the bridge. For sensing the jet stream, the thermistor ring and insulator assembly can be mounted adjacent the outside portion of skin 28 of the aircraft.

FIG. 10 discloses a temperature responsive system which can sense a change in temperature. In one embodiment the signal from sensor 57 is balanced against the signal from potentiometer 58 which is energized by reference voltage 59. Upon a change in the ambient temperature adjacent sensor 57 the balance between the signals of sensor 57 and potentiometer 58 is upset and an error signal is then delivered to input 60 of amplifier 61. Output 62 of amplifier 61 delivers an amplified error signal to motor 63 which drives gear train 64. Gear train 64 operates potentiometer 58 in a manner to provide a rebalancing signal to sensor 57 which is connected to the potentiometer by lead 65. Gear train 64 is also available to drive indicator 66 in order to visually present the temperature at sensor 57.

The rate of response of the servo system can be determined for a given error signal by the selection of motor 63, gear train 64, etc. In practice the "follow-up" response rate of the device is selected to be somewhat faster than the expected rate of change in ambient temperature conditions which are to be applied to sensor 57. This rate of "follow-up" response insures that indicator 66 is operated to substantially indicate the actual temperature at sensor 57 even during changes in temperature due to altitude and the like. However, the follow-up response of the servo is selected to be much slower than the rate of change of temperature accompanying a movement of the aircraft with respect to the jet stream.

Therefore, under normal conditions of relatively slow changes in the temperature, the servo system continuously rebalances and maintains the error signal at a value just sufficient to drive motor 63 to insure balance. Upon an input signal having a rate greater than that which the system is capable of following-up, such as the temperature change accompanying movement with respect to the jet stream, the servo follow-up capabilities are exceeded and a large error signal results at output 62 to amplifier 61. This condition can only occur when the rate of change of error is appreciably faster than the rate for which the servo can balance.

Threshold circuit 67 is conditioned to respond only to the large error signal accompanying the high rate of change at sensor 57. The response of threshold circuit 67 operates output device 68 which can be a relay, an indicator or the like. Threshold circuit 67 includes a device conditioned to operate at a predetermined level such as a "zener" diode which will conduct at a fixed level and thus transmit the signal to device 68 only under predetermined conditions.

A further embodiment of the servo system of FIG. 10 is shown in FIG. 11. Temperature sensor 69 can comprise a thermocouple connected in bridge circuit 70 which includes potentiometer 70a and resistors 70b and 70c. Under equilibrium conditions of the servo the voltage from potentiometer 50a as applied by potentiometer 70a serves to balance the output of thermocouple 69. Upon a change in temperature conditions at thermocouple 69 the balance of bridge 70 is disturbed and an unbalance error signal is delivered to amplifier 61. The output of amplifier 61 drives motor 63 which in turn operates gear train 64 to position potentiometer 58 to a point at which balance of bridge 70 is restored. As discussed in connection with FIG. 10, the servo is selected to have a predetermined rate of "follow-up." When this rate is exceeded by a rate of change temperature at thermocouple 69 such as that accompanying movement with respect to the jet stream, the servo is incapable of following-up with the net result that a large amplified error signal is delivered to threshold circuit 67. When the predetermined limiting level of threshold circuit 67 is exceeded output device 68, such as a jet stream indicator, is actuated.

While the rate of change of temperature sensing has been related to the sensing of the movement of the aircraft with respect to the jet stream, it is to be understood that the embodiments of the invention are adapted to sense the rate of change of temperature accompanying other environments and related to other physical conditions. The embodiments of the invention in which the means for retarding the response of one of the responding means is a thermo insulator thereby limiting these arrangements to the sensing or rate of change of temperature, it is to be understood that the embodiment of the invention comprising the servo arrangements are adaptable to the sensing of the rate of change of conditions other than that of temperature.

While certain embodiments of the invention have been shown and described herein it is to be understood that certain changes, additions and substitutions can be made without departing from the scope and spirit of the invention.

What is claimed is:

1. A device for sensing a change in temperature comprising a ring-shaped member of substantially homogeneous thermistor material, said thermistor material being temperature responsive, means for dividing said ring-shaped member into an electrical bridge network adapted to be balanced, and means for retarding the response of a portion of said ring-shaped member to a change in temperature, the retarding of the response of said portion being sufficient to unbalance said electrical bridge network, whereby the difference in response between the retarded portion and the other portion of said ring-shaped member senses a temperature change.

2. A device for sensing a change in temperature in accordance with claim 1 in which said means for dividing said ring-shaped member into an electrical bridge network comprises a plurality of electrical tap members connected to said ring-shaped member at predetermined spaced apart locations thereon, said tap members dividing said ring-shaped member into an electrical bridge network.

3. A system for sensing a change in conditions occurring with at least a predetermined minimum rate of change comprising a network having means for electrically responding to conditions, the response of said conditions responding means being adapted to unbalance said network, means connected to said network for balancing the response of said condition responding means, means for actuating said balancing means in response to the output signals of said conditions responding means and said balancing means, said actuating means having a maximum rate of actuation which is less than said minimum rate of change to which said conditions responding means responds, an output channel, and means connected to said actuating means and responsive to a predetermined actuating signal therefrom for activating said output channel, said predetermined actuating signal occurring whenever the rate of change in conditions exceeds said predetermined minimum rate, whereby the change in conditions is sensed.

4. A system for sensing a change in temperature having at least a predetermined minimum rate of change comprising an electrical bridge network including an element therein responsive to temperature, the response to said temperature responsive element being adapted to unbalance said network, means connected in circuit with said network and actuable for balancing any electric unbalance signal therein resulting from the response of said temperature responsive means, means connected to said network and responsive thereto for actuating said balancing means to balance said network, said actuating means having a maximum rate of actuation which is lower than said predetermined minimum rate of change, an output channel, and means connecting said output channel to said network and responsive only to an unbalance signal therefrom which is greater than a preselected level for activating said output channel, said preselected level corresponding at least to the unbalance signal of said network upon the occurrence of a rate of change in temperature greater than said minimum rate of change, whereby said output channel is only activated when the change in temperature exceeds the predetermined minimum rate of change.

5. A system for sensing a change in temperature having at least a predetermined minimum rate of change comprising an electrical bridge network including an element therein responsive to temperature, the response to said temperature responsive element being adapted to unbalance said network, means connected in circuit with said network and actuable for balancing any electric unbalance signal therein resulting from the response of said temperature responsive means, means connected to said network for amplifying the unbalance signal therein, means connected to said amplifying means and responsive thereto for actuating said balancing means to balance said network, said actuating means having a maximum rate of actuation which is lower than said predetermined minimum rate of change, an output channel, and means connecting said output channel to said amplifying means and responsive only to an output signal therefrom which is greater than a preselected level for activating said output channel, said preselected level corresponding at least to the output signal of said amplifying means upon the occurrence of a rate of change in temperature greater than said minimum rate of change, whereby said output channel is only activated when the change in temperature exceeds the predetermined minimum rate of change.

References Cited

UNITED STATES PATENTS

| | | | |
|---|---|---|---|
| 1,994,757 | 3/1935 | De Florez et al. | 73—342 XR |
| 2,139,504 | 12/1938 | King | 73—362 |
| 2,548,014 | 4/1951 | Gealt. | |
| 2,684,473 | 7/1954 | Shannon | 73—362 |
| 2,799,758 | 7/1957 | Huchins | 73—362 |
| 2,820,218 | 1/1958 | Lovegroue. | |
| 3,027,496 | 3/1962 | Donath | 340—233 XR |
| 3,104,385 | 9/1963 | Evalds | 324—106 X |

LOUIS R. PRINCE, *Primary Examiner.*

FREDERICK SHOON, S. H. BAZERMAN,
*Assistant Examiners.*